United States Patent
Ghai et al.

(10) Patent No.: US 9,876,759 B2
(45) Date of Patent: Jan. 23, 2018

(54) CARRIER GRADE NAT

(71) Applicant: Benu Networks, Inc., Billerica, MA (US)

(72) Inventors: Rajat Ghai, Sandwich, MA (US); Swarup Sahoo, Acton, MA (US)

(*) Notice: Subject to any disclaimer, the term of this patent is extended or adjusted under 35 U.S.C. 154(b) by 170 days.

(21) Appl. No.: 14/681,012

(22) Filed: Apr. 7, 2015

(65) Prior Publication Data

US 2015/0304275 A1 Oct. 22, 2015

Related U.S. Application Data (60) Provisional application No. 61/976,068, filed on Apr. 7, 2014.

(51) Int. Cl.
*G06F 15/16* (2006.01)
*H04L 29/12* (2006.01)

(52) U.S. Cl.
CPC ...... *H04L 61/2557* (2013.01); *H04L 61/2514* (2013.01); *H04L 61/2517* (2013.01)

(58) Field of Classification Search
None
See application file for complete search history.

(56) References Cited

U.S. PATENT DOCUMENTS

| | | | | |
|---|---|---|---|---|
| 2005/0114547 A1* | 5/2005 | Wu | ............... | H04L 29/12264 709/245 |
| 2005/0166206 A1* | 7/2005 | Parson | ............... | G06F 9/526 718/104 |
| 2008/0072047 A1 | 3/2008 | Sarikaya et al. | | |
| 2008/0183889 A1* | 7/2008 | Andreev | ............... | H04L 29/06 709/238 |
| 2008/0198811 A1 | 8/2008 | Deshpande et al. | | |
| 2011/0047256 A1* | 2/2011 | Babu | ............... | H04L 29/12367 709/223 |
| 2011/0274082 A1 | 11/2011 | Calhoun et al. | | |
| 2012/0179830 A1* | 7/2012 | Ait-Ameur | ............... | H04L 67/125 709/228 |
| 2013/0083691 A1 | 4/2013 | Murphy et al. | | |

(Continued)

OTHER PUBLICATIONS

International Search Report and Written Opinion issued by the U.S. Patent and Trademark Office as International Searching Authority for International Application No. PCT/US14/51264 dated Nov. 13, 2014 (12 pgs.).

*Primary Examiner* — Younes Naji
(74) *Attorney, Agent, or Firm* — Wilmer Cutler Pickering Hale and Dorr LLP (57) ABSTRACT

Described herein are techniques for providing carrier grade dynamic network address translation (NAT). The disclosed techniques allow for dynamic switching from regular NAT to network address ports translation (NAPT) based on system load. Under the NAPT mode, the disclosed techniques allow the ports of a public IP address to be broken up into contiguous blocks of ports (e.g., of the same size and/or of varying size) such that each block can be assigned to an associated (e.g., different) private IP address. For each new connection from the private IP address, if the port used is the next port sequentially, the NAT device can store an offset from the starting public/private IP address ports. If the port is not the next port sequentially, the network address translation device can associate a new block of public ports to the private IP address.

13 Claims, 7 Drawing Sheets

(56) References Cited

U.S. PATENT DOCUMENTS

2013/0083782 A1    4/2013   Murphy et al.
2013/0287012 A1   10/2013   Pragada et al.
2014/0269535 A1    9/2014   Pazhyannur et al.

* cited by examiner

| Exemplary public IP Address | Ports associated with the public IP Address | User Device | Exemplary private addresses with ports |
|---|---|---|---|
| 172.16.254.0 | 1024-2047 | User Device 1 | 192.168.0.0:49152-50157 |
| ... | ... | ... | ... |
| 172.16.254.255 | 1024-2047 | User Device 255 | 192.168.0.255:49152-50157 |
| 172.16.254.256 | 1024-2047 | User Device 256 | 192.168.0.256:49152-50157 |
| ... | ... | ... | ... |
| 172.16.254.511 | 1024-2047 | User Device 511 | 192.168.0.511:49152-50157 |
| 172.16.254.512 | 1024-2047 | User Device 512 | 192.168.0.512:49152-50157 |
| ... | ... | ... | ... |
| 172.16.254.767 | 1024-2047 | User Device 767 | 192.168.0.767:49152-50157 |
| 172.16.254.768 | 1024-2047 | User Device 768 | 192.168.0.768:49152-50157 |
| ... | ... | ... | ... |
| 172.16.254.1023 | 1024-2047 | User Device 1023 | 192.168.0.1023:49152-50157 |

FIG. 5A

| Exemplary public IP Address | Ports associated with the public IP Address | User Device | Exemplary private addresses with ports |
|---|---|---|---|
| 172.16.254.0 | 1024 | User Device 1 | 192.168.0.0:49152 |
| | ... | User Device 1 | ... |
| | 1279 | User Device 1 | 192.168.0.0:49407 |
| | 1280 | User Device 2 | 192.168.0.1:50000 |
| | ... | User Device 2 | ... |
| | 1535 | User Device 2 | 192.168.0.1:50255 |
| | 1536 | User Device 3 | 192.168.0.2:80 |
| | ... | User Device 3 | ... |
| | 1791 | User Device 3 | 192.168.0.2:335 |
| | 1792 | User Device 4 | 192.168.0.3:54001 |
| | ... | User Device 4 | ... |
| | 2047 | User Device 4 | 192.168.0.3:54256 |

FIG. 5B

| Exemplary public IP Address | Ports associated with the public IP Address | User Device | Exemplary private addresses with ports |
|---|---|---|---|
| 172.16.254.0 | 1024 | User Device 1 | 192.168.0.0:49152 |
| | ... | User Device 1 | ... |
| | 1172 | User Device 1 | 192.168.0.0:49300 |
| | 1173 | User Device 1 | |
| | ... | User Device 1 | |
| | 1279 | User Device 1 | |
| 172.16.254.0 | 1344 | User Device 1 | 192.168.0.0:49340 |
| | ... | User Device 1 | |
| | 1404 | User Device 1 | 192.168.0.0:49400 |
| | 1405 | User Device 1 | |
| | ... | User Device 1 | |
| | 1471 | User Device 1 | |
| 172.16.254.0 | 1654 | User Device 1 | 192.168.0.0:50000 |
| | ... | User Device 1 | |
| | 1664 | User Device 1 | 192.168.0.0:50010 |
| | 1665 | User Device 1 | |
| | ... | User Device 1 | |
| | 1717 | User Device 1 | |

FIG. 5C

CARRIER GRADE NAT

RELATED APPLICATIONS

This application relates to and claims priority under 35 U.S.C. §119(e) to U.S. Provisional Patent Application No. 61/976,068, titled "Carrier Grade NAT," which was filed on Apr. 7, 2014 and is hereby incorporated by reference herein in its entirety.

FIELD

The subject matter disclosed in this application generally relates to carrier grade network address translation (NAT), and more specifically, to dynamically assigning ports at the carrier grade NAT server.

BACKGROUND

With the exhaustion of the internet protocol version 4 (IPv4) addresses in 2011 and the slow progress in deploying the internet protocol version 6 (IPv6) addresses, the shortage of the public internet protocol (IP) addresses has been a global challenge faced by people in the field of network communication. As a result, oftentimes a large number of users have to share a limited number of available public IP addresses.

Carrier grade network address translation (NAT) has been adopted by many organizations to tackle the shortage of the public IP addresses. Traditionally, there are two approaches to implement carrier grade NAT, or NAT in general: the regular NAT (also known as IP-to-IP NAT) and the network port address translation (NPAT). Under the regular NAT, each private IP address is uniquely translated to a public IP address, and vice versa, such that all of the public IP address ports are reserved for the private IP address. Under the NPAT, each private IP address is no longer uniquely translated to a public IP address. Instead, each private IP address is translated to one or more ports of a public IP address. Because the NPAT mitigates, at least partially, the shortage of the public IP addresses, it has been a popular NAT approach. There are, however, several problems related to this traditional approach.

First, many software applications assume a unique public IP address, and these software applications may not work properly under the NPAT. Therefore, to enhance user experience, it would be ideal in some situations to use the regular NAT instead of the NPAT, especially when and/or where there is relatively large number of available public IP addresses.

Second, under the NPAT, each port associated with a public IP address can be assigned to different private IP addresses (and different ports associated with a private port), so the NPAT generally needs to maintain a network address translation table (NAT table) that records the public IP address, the private IP address, the public IP address port, and/or the private IP address port for each connection. The NAT table can take up lots of the memory space in a system and potentially compromise the throughput of the network.

Therefore, there is a need in the art to provide systems and methods for improving management of the carrier grade NAT server. Accordingly, it is desirable to provide methods and systems that overcome these and other deficiencies of the related art.

SUMMARY

In accordance with the disclosed subject matter, systems and methods are provided for improving the carrier grade network address translation server.

Disclosed subject matter includes, in one aspect, a computerized method for mapping one public internet protocol (IP) address to multiple private IP addresses by associating one or more sets of port numbers from a total set of available port numbers for the public IP address with each private IP address. A computing device receives a first data packet from a first user device destined for a public network, wherein the first user device has a first private IP address. The computing device associates with the first private IP address of the first user device (a) a public IP address and (b) a first set of port numbers from a total set of available port numbers for the public IP address such that for each new connection from the first private IP address with incremental port numbers the computing device can store an offset for each connection from a first port number from the first set of port numbers. The computing device receives a second data packet from a second user device destined for the public network, wherein the second user device has a second private IP address. The computing device associates with the second private IP address of the second user device (a) the public IP address and (b) a second set of port numbers from the total set of available port numbers for the public IP address such that for each new connection from the second private IP address with incremental port numbers the computing device can store an offset for each new connection from a first port number from the second set of port numbers, whereby the first private IP address and the second private IP address are mapped to the same public IP address such that IP connections from the first user device can use the first set of port numbers from the public IP address and an offset for each new connection associated with the first private IP address, and IP connections from the second user device can use the second set of port numbers from the public IP address and an offset for each new connection associated with the second private IP address.

Disclosed subject matter includes, in another aspect, a computing system configured to map one public internet protocol (IP) address to multiple private IP addresses by associating one or more sets of port numbers from a total set of available port numbers for the public IP address with each private IP address. The computing system can include a processor configured to run a module stored in memory that is configured to cause the processor to receive a first data packet from a first user device destined for a public network, wherein the first user device has a first private IP address. The module is configured to cause the processor to associate with the first private IP address of the first user device (a) a public IP address and (b) a first set of port numbers from a total set of available port numbers for the public IP address such that for each new connection from the first private IP address with incremental port numbers a computing device can store an offset for each connection from a first port number from the first set of port numbers. The module is configured to cause the processor to receive a second data packet from a second user device destined for the public network, wherein the second user device has a second private IP address. The module is configured to cause the processor to associate with the second private IP address of the second user device (a) the public IP address and (b) a second set of port numbers from the total set of available port numbers for the public IP address such that for each new connection from the second private IP address with incremental port numbers the computing device can store an offset for each new connection from a first port number from the second set of port numbers, whereby the first private IP address and the second private IP address are mapped to the same public IP address such that IP connections from the first user device can use the first set of port numbers from the public IP address and an offset for each new connection associated with the first private IP address, and IP connections from the second user device can use the second set of port numbers from the public IP address and an offset for each new connection associated with the second private IP address.

Disclosed subject matter includes, in yet another aspect, non-transitory computer readable medium comprising executable instructions operable to cause an apparatus to receive a first data packet from a first user device destined for a public network, wherein the first user device has a first private IP address. The executable instructions are operable to cause the apparatus to associate with the first private IP address of the first user device (a) a public IP address and (b) a first set of port numbers from a total set of available port numbers for the public IP address such that for each new connection from the first private IP address with incremental port numbers a computing device can store an offset for each connection from a first port number from the first set of port numbers. The executable instructions are operable to cause the apparatus to receive a second data packet from a second user device destined for the public network, wherein the second user device has a second private IP address. The executable instructions are operable to cause the apparatus to associate with the second private IP address of the second user device (a) the public IP address and (b) a second set of port numbers from the total set of available port numbers for the public IP address such that for each new connection from the second private IP address with incremental port numbers the computing device can store an offset for each new connection from a first port number from the second set of port numbers, whereby the first private IP address and the second private IP address are mapped to the same public IP address such that IP connections from the first user device can use the first set of port numbers from the public IP address and an offset for each new connection associated with the first private IP address, and IP connections from the second user device can use the second set of port numbers from the public IP address and an offset for each new connection associated with the second private IP address.

Before explaining example embodiments consistent with the present disclosure in detail, it is to be understood that the disclosure is not limited in its application to the details of constructions and to the arrangements set forth in the following description or illustrated in the drawings. The disclosure is capable of embodiments in addition to those described and is capable of being practiced and carried out in various ways. Also, it is to be understood that the phraseology and terminology employed herein, as well as in the abstract, are for the purpose of description and should not be regarded as limiting.

These and other capabilities of embodiments of the disclosed subject matter will be more fully understood after a review of the following figures, detailed description, and claims.

It is to be understood that both the foregoing general description and the following detailed description are explanatory only and are not restrictive of the claimed subject matter.

BRIEF DESCRIPTION OF THE DRAWINGS

Various objects, features, and advantages of the disclosed subject matter can be more fully appreciated with reference to the following detailed description of the disclosed subject matter when considered in connection with the following drawings.

DETAILED DESCRIPTION

In the following description, numerous specific details are set forth regarding the systems and methods of the disclosed subject matter and the environment in which such systems and methods may operate, in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the embodiments described below are only examples, and that it is contemplated that there are other systems and methods that are within the scope of the disclosed subject matter.

The disclosed techniques allow for dynamic network address translation such that one public IP address can be translated to multiple private IP addresses in a manner that can conserve memory allocation at the network address translation device. The ports of a public IP address can be broken up into contiguous blocks of ports (e.g., of the same size and/or of varying size) such that each block can be assigned to an associated (e.g., different) private IP address. For each private IP address to public ports mapping, the network address translation server can store, for example, the public IP address, the private IP address, the starting public IP address port for the port block, and/or the starting private IP address port. For each new connection from the private IP address, if the port used is the next port sequentially, the network address translation device can store an offset from the starting public/private IP address ports. If the port is not the next port sequentially, the network address translation device can associate a new block of public ports to the private IP address (e.g., and reduce the size of the new block of public ports from the original size of public ports).

Figure 1:
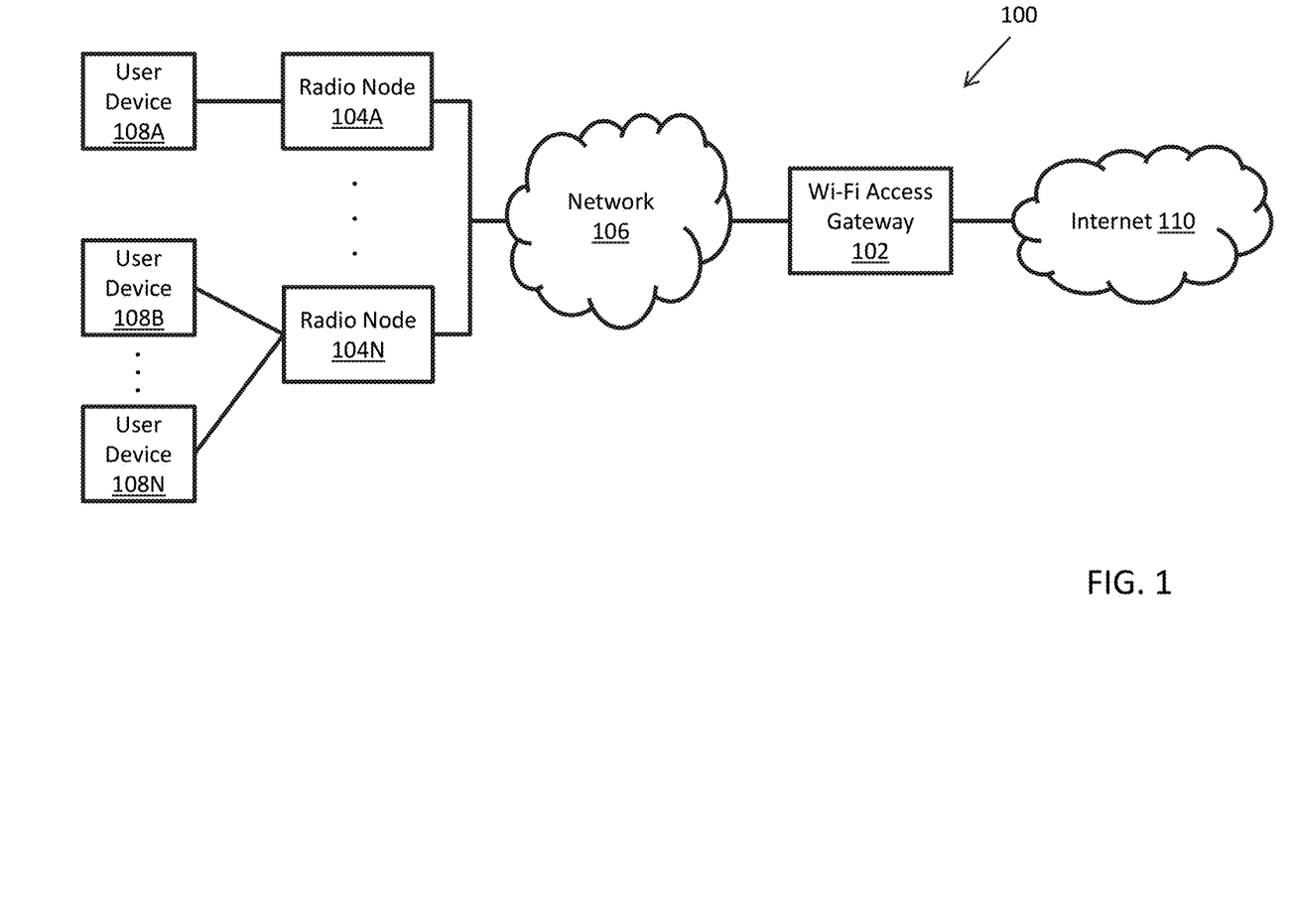
FIG. 1 illustrates a block diagram of a system for mapping public internet protocol (IP) addresses to private IP addresses, according to some embodiments of the disclosed subject matter.

FIG. 1 illustrates a block diagram of a system 100 for mapping public IP addresses to private IP addresses, according to some embodiments of the disclosed subject matter. In some embodiments the system 100 can be a large scale Wi-Fi domain that extends to millions of user devices. As shown in FIG. 1, the system 100 includes a Wi-Fi access gateway 102 (also referred to herein as WAG 102) in communication with radio nodes 104A through 104N (collectively referred to herein as radio node 104) via a network 106. Each radio node 104 can be in communication with a set of user devices. As shown in system 100, radio node 104A is in communication with user device 108A and radio node 104N is in communication with user device 108B through user device 108N (collectively referred to herein as user device 108). Wi-Fi access gateway 102 is connected to the Internet 110. The components illustrated in FIG. 1 can be further broken down into more than one component and/or combined together in any suitable arrangement. Further, one or more components can be rearranged, changed, added, and/or removed.

Referring to the WAG 102, the WAG 102 directs upstream network traffic from the user device 108 to the Internet 110 and downstream network traffic from the Internet 110 to the user device 108. In some embodiments, the WAG 102 communicates with the user device 108 directly. The WAG 102 performs network address translation, including mapping public IP addresses to private IP addresses, and private IP addresses to public IP addresses. In some embodiments, the WAG 102 communicates with the WiFi device 108 indirectly via the radio node 104 and/or the network 106.

The WAG 102 can provide IP services and/or muting functions, such as DHCP, UPnP, NAT-PMP, ACL, the address resolution protocol (ARP), and/or other services and functions. The WAG 102 can provide dual stack IP to offer service to both IPv4and IPv6. As shown in FIG. 1, the WAG 102 can provide backbone connectivity to the Internet 110. The WAG 102 can also provide security and session isolation among connections with each of the radio nodes 104.

The WAG 102 can provide a data plane with radio nodes 104, such as described in U.S. patent application Ser. No. 14/460,657, titled "Centrally Managed Wi-Fi," which is filed on Aug. 15, 2014 and is hereby incorporated by reference herein in its entirety. In some embodiments, the WAG 102 is a highly scalable platform that implements data/traffic plane aggregation of switched Ethernet virtual domains over a wide geographical area, allowing the WAG 102 to serve millions of devices. The WAG 102 can include connections to each of the radio nodes 104, such as a generic routing encapsulation (GRE) tunnel that encapsulates network traffic from the user devices 108, served by a corresponding radio node 104.

In some embodiments, the WAG 102 provides high performance point-to-point switched Layer 2 domain. In a classical OSI layered computer networking model, network mobility (e.g., for session persistence) is often quicker at lowers layers, e.g. Ethernet (layer 2) as opposed to networking layer (L3) or application layer (L7). However, the lower layers are often more messaging intensive than higher layers. The network can be configured to provide for a wide area Layer 2 network, such that high-performance equipment is able to participate with exponentially large number of transactions per second (TPS) while still providing seamless mobility at the MAC layer (Ethernet Layer). For example, flat Layer 2 domains (e.g., also called broadcast domains) are usually geographically small by design. To create a wide area Layer 2 network, virtual networks can be created by creating Layer 2 tunnels such that two devices think that they can see each other directly, yet they are located remotely from each other. These tunnels (e.g., also called overlays) are point to point over a routed IP network. Under some embodiments, such tunnels are also called pseudo-wires.

In some embodiments, the WAG 102 provides a high performance IP data/forwarding plane that can analyze, shape, forward, etc. IP traffic from end user devices. As alluded to above, network such as Layer 2 domains are often very messaging intensive, which is why they are often limited to a small geographical area serving a small set of devices on a Ethernet segment. However, by creating large wide area Layer 2 networks, the techniques described herein can support processing a tremendous number (e.g., hundreds of millions) of packets/frames per second by using wide area Layer 2 networks. Dense aggregation at the WAG 102 with a high performance forwarding plane (e.g., packet processing) allows service providers to, for example, inspect, and inject cloud-based bespoke data services (e.g. content filtering and parental control). The structures, functions, and features of the WAG 102 are described in more detail below with reference to FIG. 2.

Referring to the network 106, the WAG 102 and the radio nodes 104 are connected via the network 106. The network 106 can include Ethernet, any wired connection, any wireless connection, the Internet, a cellular network, a telephone network, a computer network, a packet switching network, a line switching network, a local area network (LAN), a wide area network (WAN), a personal area network (PAN), a metropolitan area network MAN), a global area network, or any number of private networks currently referred to as an Intranet, or any other network or combination of networks that can accommodate data communication. Such networks may be implemented with any number of hardware and/or software components, transmission media and/or network protocols. Although FIG. 1 illustrates the network 106 as a single network, the network 106 can include multiple interconnected networks.

Referring to the radio node 104, the radio node 104 can include a processor configured to implement the functionality described herein using computer executable instructions stored in temporary and/or permanent non-transitory memory. The memory can be flash memory, a magnetic disk drive, an optical drive, a programmable read-only memory (PROM), a read-only memory (ROM), or any other memory or combination of memories. The processor can be a general purpose processor and/or can also be implemented using an application specific integrated circuit (ASIC), programmable logic array (PLA), field programmable gate array (FPGA), and/or any other integrated circuit. As explained further herein, due to the system 100 structure the radio node 104 can be less complex than existing nodes, and can therefore be a lower-cost device. For example, access points typically have complete IP routing capability (e.g., in addition of providing Radio function, the access points also provide an edge router function and offer services like DHCP Service, IP NAT service, etc.). These and other features often make access points complex and rigid. The radio node 104, on the other hand, in some embodiments is comparable to the access point only from a radio-function standpoint. For example, in some embodiments the radio node 104 does not have the IP router function and associated IP services. Rather, such radio nodes 104 merely bridge the Internet traffic from the WAG 102 to the user device 108 and from the user device 108 to the WAG 102.

Referring to user device 108, a user device 108 can include any type of device that supports WiFi, including, without limitation, laptops, desktops, smartphones, tablets, gaming consoles, embedded household appliances (e.g., TVs, thermostats, video projectors, set-top boxes or set-top units, digital video recorders (DVR)), and/or other devices that support Wi-Fi.

In some embodiments, the system 100 can include one or more of the following components: cloud services, cellular network, management entity, and access controller. For example, in some embodiments, the cloud services can include services that provide for sharing of digital media between multimedia devices. In some embodiments, the management entity can be a cloud-based platform leveraging open compute APIs to the radio nodes 104 and the WAG 102. In some embodiments, the access controller can provide a highly scalable IP control plane to the radio nodes 104 that can be scaled linearly on demand.

The components of system 100 can include additional interfaces (not shown) that can allow the components to communicate with each other and/or other components, such as other devices on one or more networks, server devices on the same or different networks, or user devices either directly or via intermediate networks. The interfaces can be implemented in hardware to send and receive signals from a variety of mediums, such as optical, copper, and wireless, and in a number of different protocols, some of which may be non-transient.

Figure 2:
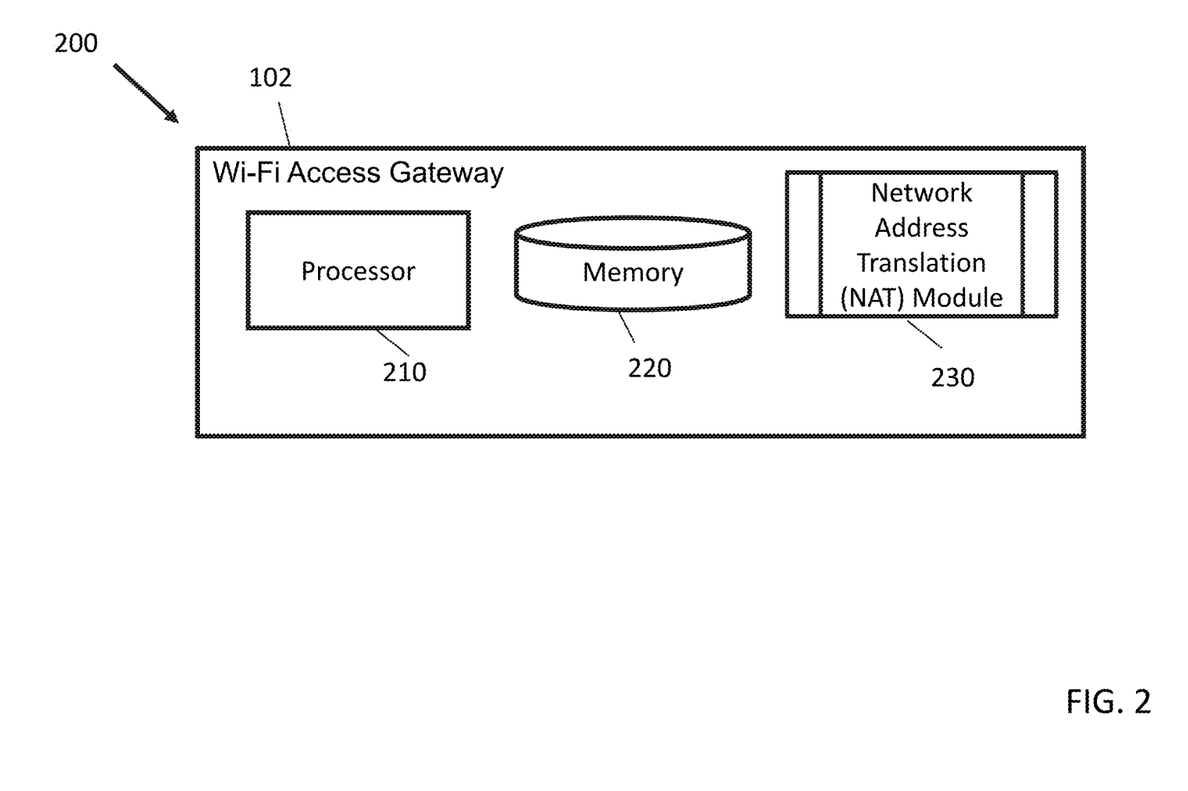
FIG. 2 illustrates a block diagram of a Wi-Fi access gateway, according to some embodiments of the disclosed subject matter.

FIG. 2 illustrates a block diagram of a Wi-Fi access gateway 102, or WAG 102, according to some embodiments of the disclosed subject matter. As shown in FIG. 2, the WAG 102 can include a processor 210, a memory 220, and a network address translation (NAT) module 230. The components illustrated in FIG. 2 can be further broken down into more than one component and/or combined together in any suitable arrangement. Further, one or more components can be rearranged, changed, added, and/or removed. The NAT module 230 can be part of the memory 230 or can be separated from the memory 230. In some embodiments, certain or all components of the processor 210, the memory 220, and/or the NAT module 230 can function as a network address translation server (NAT server). In some embodiments, the WAG 102 may include a separate NAT server.

The processor 210 is configured to implement the functionality described herein using computer executable instructions stored in temporary and/or permanent non-transitory memory. The processor can be a general purpose processor and/or can also be implemented using an application specific integrated circuit (ASIC), programmable logic array (PLA), field programmable gate array (FPGA), and/or any other integrated circuit.

The processor 210 can execute an operating system that can be any operating system, including a typical operating system such as Windows, Windows XP, Windows 7, Windows 8, Windows Mobile, Windows Phone, Windows RT, Mac OS X, Linux, VXWorks, Android, Blackberry OS, iOS, Symbian, or other OSs.

In some embodiments, the processor 210 can reside in a data center and form a node in a cloud computing infrastructure. The processor 210 can also provide services on demand.

The NAT module 230 can be configured to translate, or map, public IP addresses to private IP addresses and/or private IP addresses to public IP addresses. In some embodiments, the NAT module 230 can be configured to map one public IP address to multiple private IP addresses by associating one or more sets of port numbers from a total set of available port numbers for the public IP address with each private IP address. For example, the NAT module 230 can be configured to receive a first data packet from a first user device destined for a public network, such as the Internet, wherein the first user device has a first private IP address. The NAT module 230 can be configured to associate with the first private IP address of the first user device a public IP address and a first set of port numbers from a total set of available port numbers for the public IP address such that for each new connection from the first private IP address with incremental port numbers the computing device can store an offset for each connection from a first port number from the first set of port numbers. The NAT module 230 can be configured to receive a second data packet from a second user device destined for the public network, wherein the second user device has a second private IP address. The NAT module can be configured to associate with the second private IP address of the second user device the public IP address and a second set of port numbers from the total set of available port numbers for the public IP address such that for each new connection from the second private IP address with incremental port numbers the computing device can store an offset for each new connection from a first port number from the second set of port numbers, whereby the first private IP address and the second private IP address are mapped to the same public IP address such that IP connections from the first user device can use the first set of port numbers from the public IP address and an offset for each new connection associated with the first private IP address, and IP connections from the second user device can use the second set of port numbers from the public IP address and an offset for each new connection associated with the second private IP address.

The NAT module 230 can be implemented in software using the memory 220. The memory 220 can be a non-transitory computer readable medium, flash memory, a magnetic disk drive, an optical drive, a PROM, a ROM, or any other memory or combination of memories.

FIG. 2 shows the WAG 102 having the NAT module 230 that performs the above-described operations in accordance with certain embodiments of the disclosed subject matter. The processor 210 or the WAG 102 may include additional modules, less modules, or any other suitable combination of modules that perform any suitable operation or combination of operations.

Figure 3:
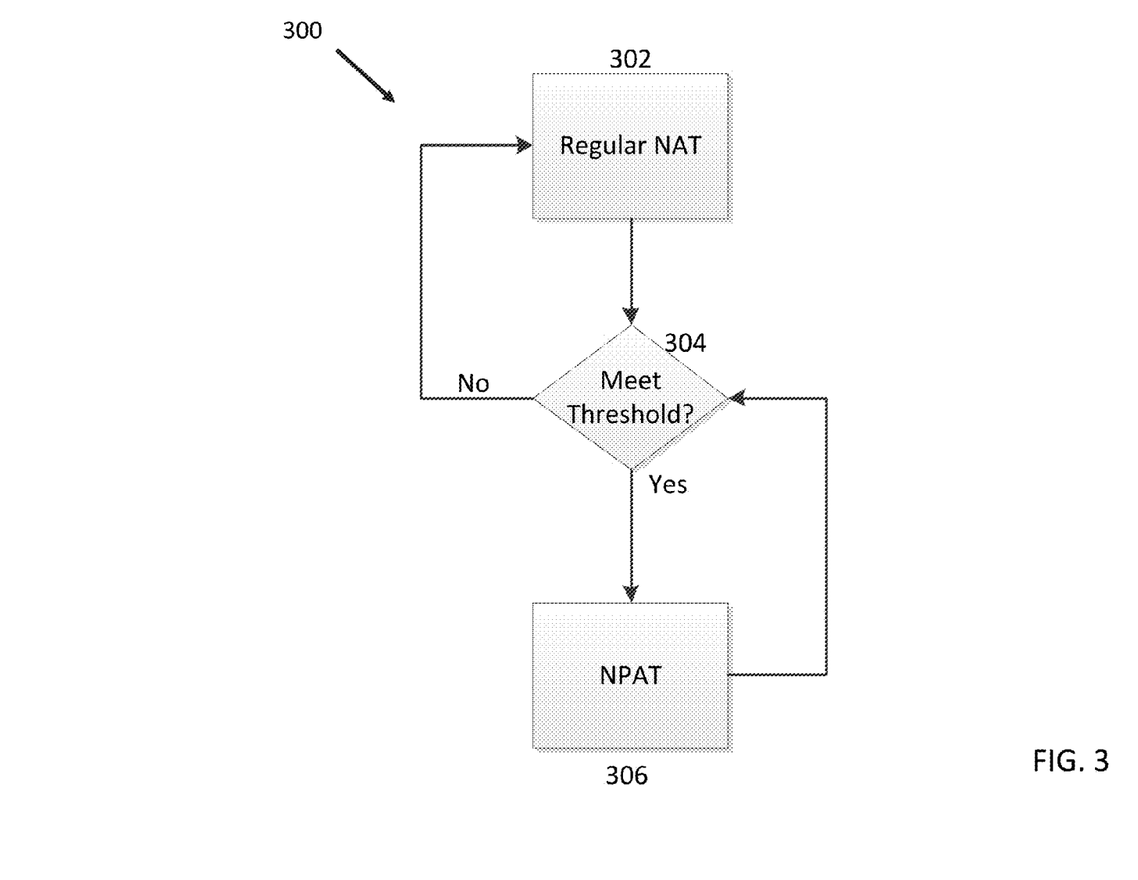
FIG. 3 illustrates a flow diagram illustrating a computerized method of mapping between public IP addresses and private IP addresses, according to some embodiments of the disclosed subject matter.

FIG. 3 illustrates a flow diagram illustrating a computerized process 300 implemented by the WAG for mapping between private IP addresses and public IP addresses, according to some embodiments of the disclosed subject matter. The computerized process 300 can include two methods of network address translation: the regular network address translation (regular NAT) and the network port address translation (NPAT).

Under the regular NAT, each private IP address is uniquely translated to a public IP address, and vice versa, such that all of the public IP address ports are reserved for the private IP address. The regular NAT is also commonly referred to as the straight NAT, or IP-to-IP NAT. The regular NAT generally needs to maintain a NAT table that records the public IP address and the private IP address for each connection. In some embodiments, the NAT table also needs to record the public IP address port and the private IP address port for each connection. In some embodiments, the NAT table records pointers to the public IP address port and the private IP address port for each connection. The regular NAT has many advantages. For example, the one-to-one mapping between public IP addresses and private IP addresses enhances traceability of the network traffic and user experience. In addition, if a given application assumes that a unique IP address and/or port will be assigned, that application may only be working properly under the regular NAT scenario. However, the number of public IP addresses required under the regular NAT is directly proportional to the number of user devices. Therefore, when there are many user devices associated with a WAG 102, the public IP addresses assigned to the WAG 102 can be quickly ran out.

Under the NPAT, each private IP address is no longer uniquely translated to a public IP address. Instead, each private IP address is translated to one or more ports of a public IP address. Because a public IP address can have a relatively large number of ports, each public IP address can be translated to multiple private IP addresses under the NPAT. The NPAT is also known as network address port translation (NAPT) or port address translation (PAT). The NPAT mitigates the shortage of public IP addresses, but the NPAT also has two drawbacks. First, certain applications or services that require unique or fixed public IP address may not work properly under the NPAT. Second, under the NPAT, each port associated with a public IP address can be assigned to different private IP addresses (and different ports associated with a private port), so the NPAT, at least the traditional NPAT, generally needs to maintain a NAT table that records the public IP address, the private IP address, the public IP address port, and the private IP address port for each connection. In some embodiments, the NAT table can additionally or alternatively record pointers to the public IP address port and the private IP address port for each connection. The NAT table can take up lots of the memory space in a system such as the WAG 102, and can potentially compromise the throughput of the network. As a result, between the regular NAT and the NPAT, there is a tradeoff between user experience and availability of public IP address. If the number of available public IP addresses is relatively high, then it can be advantageous to use regular NAT to ensure user experience of each user device 108. If the number of available public IP addresses is relatively low, then it can be advantageous to use NPAT to ensure more user devices 108 can be assigned a public IP address with ports.

The computerized process 300 can dynamically switch between the regular NAT and the NPAT. The computerized process 300 begins in state 302. In state 302, the module 230 is configured to directly translate a private IP address to a public IP address under the regular NAT as described above.

For example, in the system 100, when the WAG 102 receives a first data packet destined for a public network from a first user device 108A that has a first private IP address, the NAT module 230 is configured to assign a first public IP address to the first private IP address. The NAT module 230 stores the public IP address, the private IP address, the public IP address port and the private IP address port for the data connection associated with the first data packet. Next, when the WAG 102 receives a second data packet destined for the public network from the first user device 108A, the first private IP address associated with the first user device 108A will be translated to the same first public IP address. In some embodiments, if the first data packet of the first user device 108A and the second data packet of the first user device 108A are originated from different applications or services, the private IP address associated with the two data packets can be assigned to the same first public IP address but with different ports. The NAT module 230 stores for this new connection the public IP address and the private IP address. In some embodiments, the NAT module 230 additionally stores the new public IP address port and the new private IP address port for the data connection associated with the different application or service.

Still in state 302, if the WAG 102 receives a first data packet destined for the public network from a second user device 108B that has a second private IP address, the NAT module 230 is configured to assign a second public IP address to the second private IP address. Next, when the WAG 102 receives a second data packet destined for the public network from the second user device 108B, the second private IP address associated with the second user device 108B will be translated to the same second public IP address. In some embodiments, if the first data packet of the first user device 108B and the second data packet of the second user device 108B are originated from different applications or services, the private IP address associated with the two data packets can be assigned to the same second public IP address but with different ports. In some embodiments, the NAT module 230 maintains a NAT table that records address mapping between private IP addresses and public IP addresses, including the ports associated with each connection. In some embodiments, the NAT table can be maintained by other components of the WAG 102 or directly by the WAG 102. In some embodiments, the NAT table can be maintained by a NAT server. In some embodiments, before the NAT module 230 is configured to assign a public IP address to a private IP address, the NAT module 230 is configured to first check whether or not a public IP address has already been assigned to the private IP address.

Figure 5A:
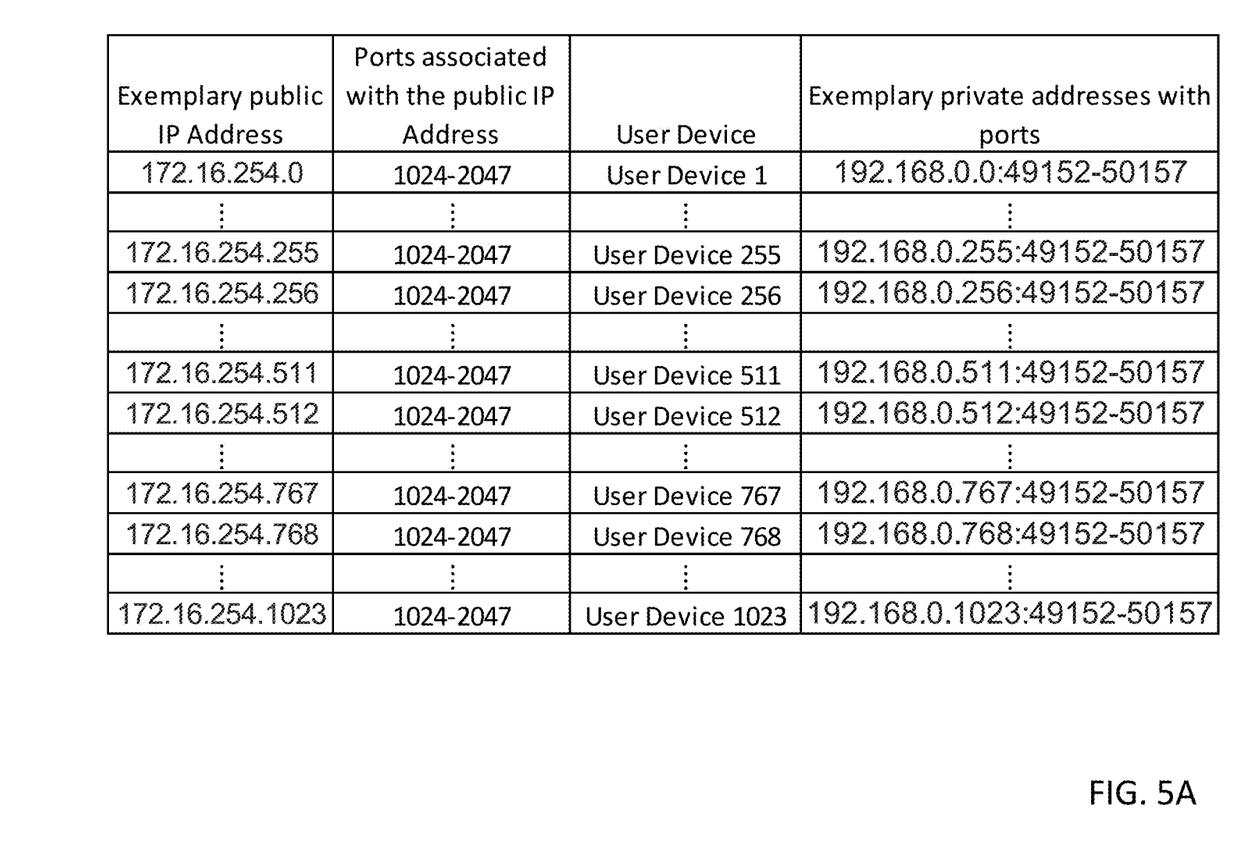
FIG. 5A illustrates an example of a network address translation table under regular network address translation, according to some embodiments of the disclosed subject matter.

FIG. 5A illustrates an example of a NAT table under the regular NAT. In FIG. 5A, each user device will be assigned to a dedicated public IP address (and therefore all of the ports of the public IP address are dedicated to the private IP address). For example, for user device 1, its private IP address, 192.168.0.0, is translated to a dedicated public IP address, 172.16.254.0. And for user device 255, its private IP address, 192.168.0.255, is also translated to a dedicated public IP address, 172.16.254.255. In some embodiments, if a user device runs multiple applications and/or services, each application or service can be assigned to a different port for both private IP address and public IP address. For example, the first application of the user device 1 can have a private IP address with port, 192.168.0.0:49152 (the starting private port 49152 is chosen arbitrarily), and a dedicated public IP address with port, 172.16.254.0:1024 (the starting public port 1024 is chosen arbitrarily). In some embodiments, a private IP address with port can be translated to a dedicated public IP address with a same port number: as a non-limiting example, private IP address 192.168.0.0:49152 can be translated to public IP address 172.16.254.0:49152.

As described above, although the regular NAT generally enhances user experience, the number of public IP addresses required under the regular NAT is directly proportional to the number of user devices 108. Therefore, when there are many user devices 108 associated with a WAG 102, the public IP addresses assigned to the WAG 102 can be quickly ran out. To conserve the number of IP addresses, each time the NAT module 230 assigns a public IP address in state 302, the computerized process 300 will move to state 304 to check utilization rate of the public IP addresses.

In state 304, the NAT module 230 checks whether or not the utilization rate of the public IP addresses meets a predetermined threshold. As a non-limiting example, if the number of the total public IP addresses available to the system 100 is 1000, and if the threshold is set to be 25% utilization rate of the total pubic IP addresses, then the threshold will be met once 250 public IP addresses are assigned. If the threshold is met in state 304, the process 300 will stop the regular NAT and moves to state 306. If the threshold is not met in state 304, the process 300 will move to state 302 and continue with the regular NAT for the next received data packet.

In state 306, the process 300 switches to the NPAT. As described above, under the NPAT, each port associated with a public IP address can be assigned to different private IP addresses (and different ports associated with a private port), the NPAT, at least the traditional NPAT, therefore generally needs to maintain a NAT table that records the public IP address, the private IP address, the public IP address port, and the private IP address port for each connection. In some embodiments, the NAT table can additionally or alternatively record pointers to the public IP address port and the private IP address port for each connection. The NAT table can take up lots of the memory space in the system. The disclosed invention improves the NPAT by assigning a block of contiguous ports of a public IP address to a user device 108. The invention is partly based on the following observation of activities associated with any given user device 108: when a user device 108 starts an activity, such as browsing the Internet, a lot of ports associated with the private IP address of the user device 108 are allocated and/or opened and needed to be mapped to public IP addresses with public ports. Furthermore, the opened private ports can oftentimes increase monotonically. In other words, the opened private ports can frequently be contiguous (e.g., port one is opened after port zero, port two is opened after port one, and so on). Therefore, by assigning a block of contiguous private ports to a corresponding block of contiguous public ports, the NAT table can be configured to only store the full IP address information associated with the starting private port and the corresponding starting public port. For other private ports within a block of contiguous ports, the NAT table can be configured to only store the offset information with respect to the starting private port or the previous contiguous private port. In some embodiments, the offset information can be stored by a counter.

For example, in the system 100, when the WAG 102 receives a first data packet destined for the public network from a first user device 108A that has a first private IP address with a first starting private port, the NAT module 230 is configured to assign a first public IP address with a first starting public port to the first private IP address with the first starting private port. The NAT module 230 stores the public IP address, the private IP address, the starting public IP address port, and the starting private IP address port for the data connection associated with the first data packet from the first user device 108A. In some embodiments, the NAT table can additionally or alternatively record pointers to the starting public IP address port and the starting private IP address port for each connection. In some embodiments, the NAT table can also assign an index value of zero for the IP connection for the first data packet. Next, when the WAG 102 receives a second data packet destined for the public network from the first user device 108A that has the first private IP address with a second private port, the NAT module 230 can be configured to check whether or not the second private port of the first private IP address is contiguous to the first starting private port. In other words, the NAT module 230 can be configured to check whether or not the first starting private port and the second private port of the first private IP address are sequential. If the second private port of the first private IP address is contiguous to the first starting private port, the NAT module 230 can be configured to assign a second public port that is contiguous to the first starting public port to the second private port of the first private IP address. Instead of storing the public IP address, the private IP address, the public IP address port, and the private IP address port for the data connection associated with the second data packet from the first user device 108A to the NAT table, the NAT module 230 can simply note that the IP address of the second data packet from the first user device 108A and the IP address of the first data packet from the first user device 108A are offset by one private port and one pubic port. In some embodiments, the NAT table can shift and/or increment the pointers to the public IP address port and the private IP address port by an offset value, where the offset value can be maintained by a counter or the index value. For example, for the second data packet from the first user device 108A, the counter and/or the index value can be stored value of one. And for a next sequential data packet (e.g., a third data packet) from the first user device 108A, the counter and/or index value can be incremented by one.

Still in state 306, if the WAG 102 receives a first data packet destined for the public network from a second user device 108B that has a second private IP address with a second starting private port, the NAT module 230 can be configured to assign the first public IP address with a second starting public port to the second private IP address with the second starting private port. The NAT module 230 stores the public IP address, the private IP address, the starting public IP address port, and the starting private IP address port for the data connection associated with the first data packet of the second user device 108B. In some embodiments, the NAT table can additionally or alternatively record pointers to the public IP address port and the private IP address port for each connection. In some embodiments, the NAT table can also assign an index value of zero for the IP connection for the first data packet. Next, when the WAG 102 receives a second data packet destined for the public network from the second user device 108B that has the second private IP address with a second private port, the NAT module 230 can be configured to check whether or not the second private port of the second private IP address is contiguous to the second starting private port. In other words, the NAT module 230 can be configured to check whether or not the second starting private port and the second private port of the second private IP address are sequential. If the second private port of the second private IP address is contiguous to the second starting private port, the NAT module 230 can be configured to assign a second public port that is contiguous to the second starting public port to the second private port of the second private IP address. Instead of storing the public IP address, the private IP address, the public IP address port, and the private IP address port for the data connection associated with the second data packet from the second user device 108B to the NAT table, the NAT module 230 can simply note that the IP address of the second data packet from the second user device 108B and the IP address of the first data packet from the second user device 108B are offset by one private port and one pubic port. In some embodiments, the NAT table can shift and/or increment the pointers to the public IP address port and the private IP address port by an offset value, where the offset value can be maintained by a counter or the index value. For example, for the second data packet, the counter and/or the index value can be stored value of one. And for a next sequential data packet (e.g., a third data packet) from the second user device 108B, the counter and/or index value can be incremented by one. In some embodiments, before the NAT module 230 is configured to assign a public IP address with public port to a private IP address with a private port, the NAT module 230 is configured to first check whether or not a public IP address with a public port has already been assigned to the private IP address with the private port. In some embodiments, if all ports of a pubic IP address have been assigned, then the NAT module 230 can be configured to assign ports of another public IP address that is belong to the WAG 102.

Figure 5B:
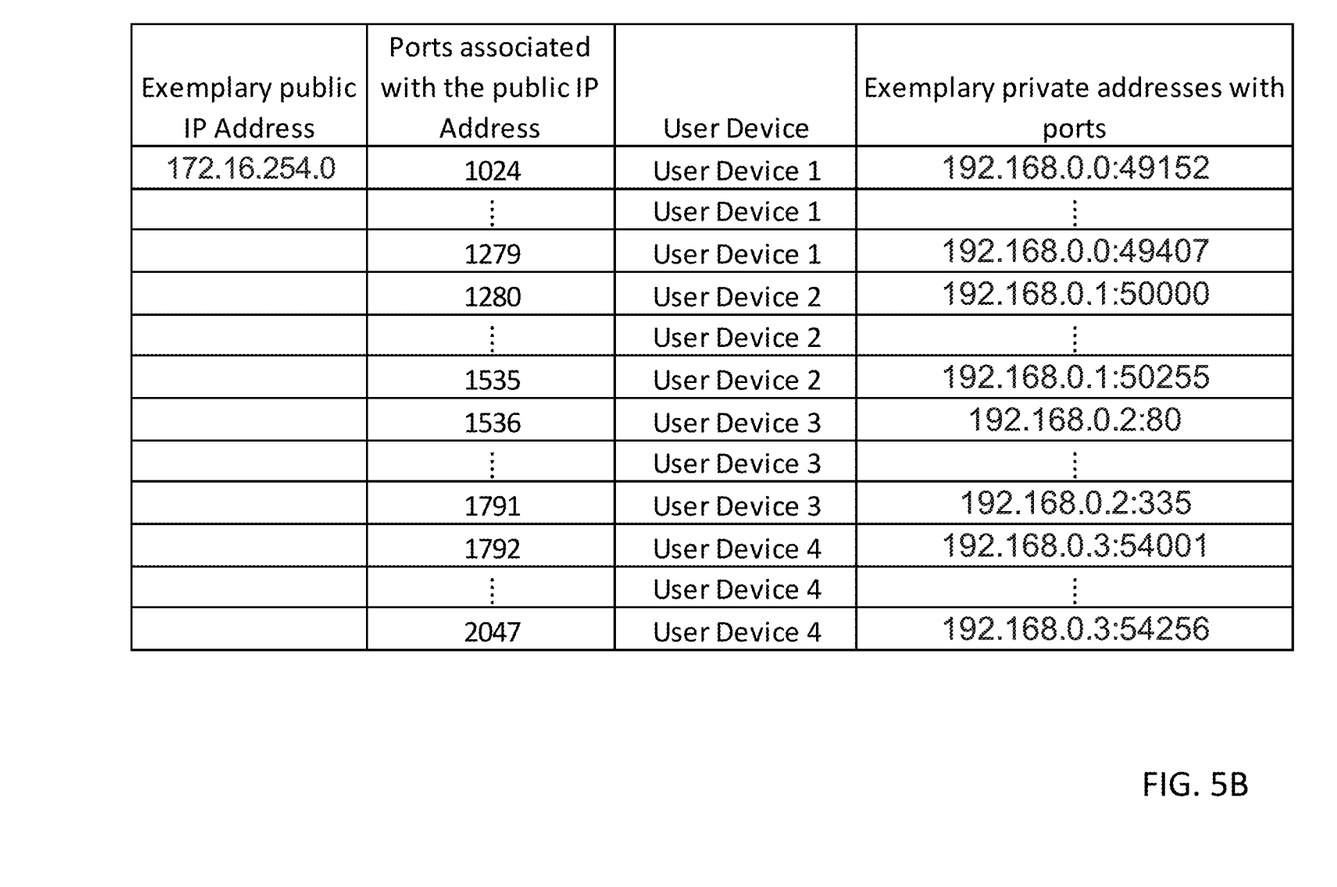
FIG. 5B illustrates an example of a network address translation table under network port address translation, according to some embodiments of the disclosed subject matter.

FIG. 5B illustrates an example of a NAT table under the NPAT. In FIG. 5B, each user device will be assigned to the same public IP address but with different port blocks. As a non-limiting example, in FIG. 5B, each user device is assigned to 256 contiguous ports of the public IP address 172.16.254.0. Assuming the public IP address 172.16.254.0 has 1024 ports, this public IP address can be mapped to four user devices with each user device having 256 ports. In some embodiments, more ports or fewer ports can be assigned to each user device. Also in FIG. 5B, all 256 private IP address ports and 256 public IP address ports for each user device are assumed to be contiguous. For example, in FIG. 5B, the 256 public IP address ports for user device 1 range from 172.16.254.0: 1024 to 172.16.254.0: 1279 (the starting public port 1024 is chosen arbitrarily), and the 256 private IP address ports for user device 1 range from 192.168.0.0: 49152 to 192.168.0.0: 49407 (the starting private port 49152 is chosen arbitrarily). As a result, for user device 1, the NAT module 230 can be configured to only store the full IP address translation information for the first port: the private IP address 192.168.0.0: 49152 is translated to the public IP address 172.16.254.0: 1024. For other ports of the user device 1, their IP address translation information can be represented by an offset data from the first port. For example, the private port 192.168.0.0: 49157 is offset from the first private port 192.168.0.0: 49152 by 5 ports, and its corresponding public port is also offset from the first public port by 5 ports, which is 172.16.254.0: 1029. Under the traditional NPAT without assigning contiguous public ports to contiguous private ports, the NAT module 230 would be required to store 256 full IP address translation information for all 256 ports of the user device 1. Therefore, the disclosed invention reduces the storage of full IP address translation information by a factor of the block size, which is 256 in this non-limiting example illustrated by FIG. 5B (in reality, the memory space reduction for the disclosed invention may be less than the factor of the block size, because the offset information may also require some small memory space). In some embodiments, a private IP address port can be translated to a public IP address port with a same port number: as a non-limiting example, private IP address 192.168.0.0:49152 can be translated to public IP address 172.16.254.0:49152.

In some embodiments, the computerized process 300 may release public IP addresses and/or public IP address ports previously assigned if they have been idle for a certain time. In some embodiments, after each time the computerized process 300 assigns public IP address ports in state 306, it will move to state 304 and check the utilization rate of the public IP address. If the threshold is met in state 304, the process 300 will move back to state 306 and continue with the NPAT. If the threshold is not met in state 304, the process 300 will move to state 302 and switch to the regular NAT. The computerized process 300 can be modified by, for example, having states rearranged, changed, added, and/or removed.

In some embodiments, private ports opened for a user device may not be sequential. For example, the private ports opened for a user device can be from port 49152 to port 49300, from port 49340 to port 49400, and from port 50000 to port 50010. Under the NPAT with contiguous port block assignment as disclosed in this invention, a separate block of contiguous public ports will be assigned to each block of contiguous private ports. The structures, functions, and features of the state 306 are described under this scenario in more detail below with reference to FIGS. 4 and 5C.

Figure 4:
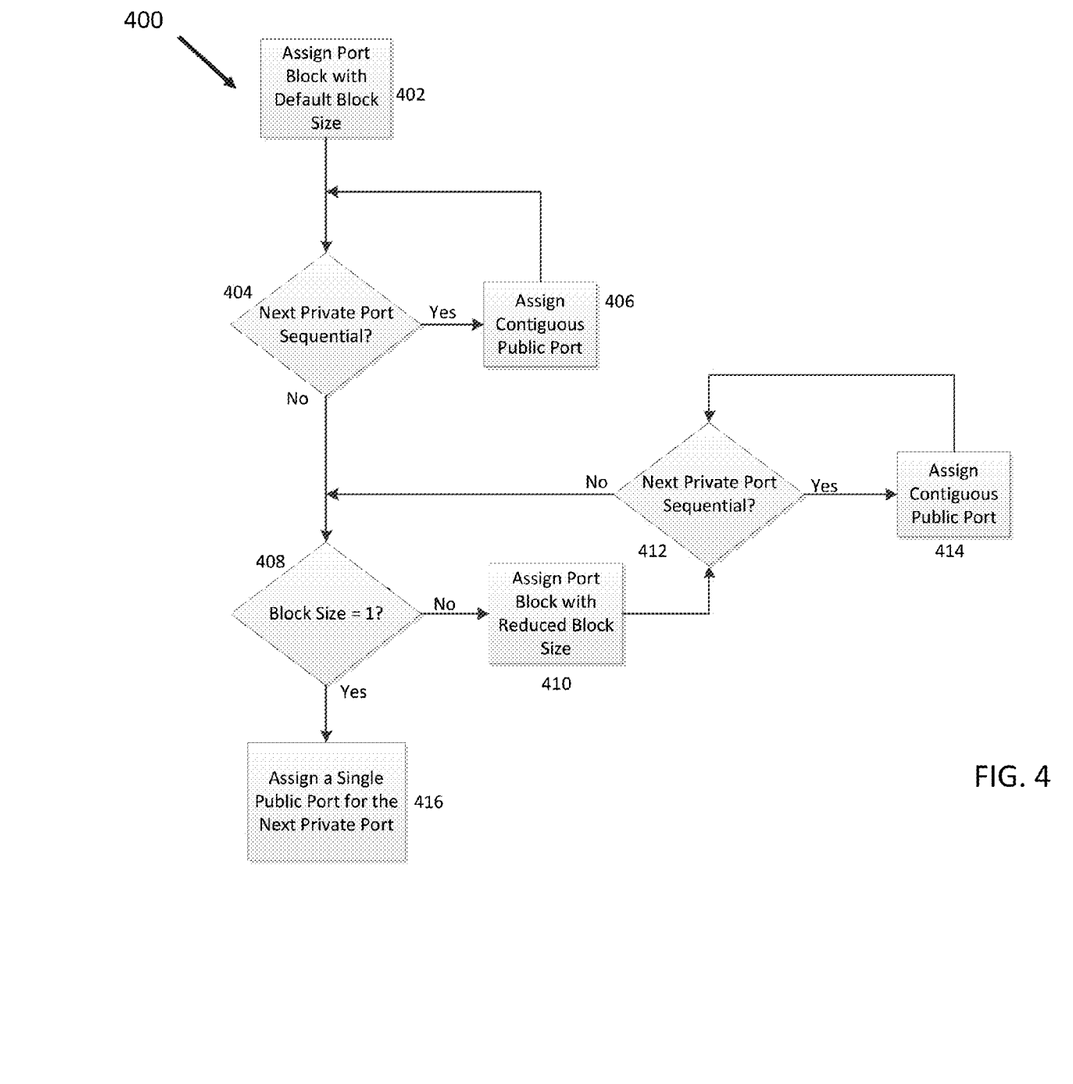
FIG. 4 illustrates a flow diagram illustrating a computerized method of mapping between public IP addresses and private IP addresses, according to some embodiments of the disclosed subject matter.

FIG. 4 illustrates a flow diagram illustrating a computerized process 400 that implements the state 306, according to some embodiments of the disclosed subject matter. Specifically, the computerized process 400 illustrates the state 306 with respect to a first user device 108A, where the first user device 108A has several separate blocks of contiguous private ports as described in the previous paragraph. The computerized process 400 can be similarly applied to other user devices as well. The computerized process 400 can be modified by, for example, having states rearranged, changed, added, and/or removed.

The computerized process 400 starts in state 402. In the state 402, the computerized process 400 sets a default block size of the port block. In some embodiments, the default block size can be set to be a power of 2, such as 2, 4, 8, 16, 32, 64, 128, 256, 512, etc. In some embodiments, the default size can be set to a relatively large number, such as 128, 256, or 512. Other values can be used, such as numbers that are not a power of 2 (e.g., 100, 200, etc.).

Still in state 402, the WAG 102 receives a first data packet from the first user device 108A that has a first private IP address with a first starting private port. The NAT module 230 is configured to allocate a block of contiguous public ports for the first user device 108A, where the block size is the default block size also determined in state 402. The NAT module 230 is configured to assign a first public IP address with a first starting public port to the first private IP address with the first starting private port. The NAT module 230 stores the public IP address, the private IP address, the starting public IP address port, and the starting private IP address port for the data connection associated with the first data packet from the first user device 108A. The computerized process 400 then moves to state 404.

In state 404, the WAG 102 receives a next data packet destined for the public network from the first user device 108A that has the first private IP address with a next private port. The NAT module 230 can be configured to check whether or not the next private port of the first private IP address is contiguous to a previously received private port of the first private IP address. In other words, the NAT module 230 can be configured to check whether or not the previously received private port and the next private port are sequential. If the next private port and the previously received private port are sequential, the computerized process 400 moves to state 406. If the next private port and the previously received private port are not sequential, the computerized process 400 moves to state 408.

In state 406, the NAT module 230 is configured to assign a next public port from the block of contiguous public ports to the next private port, where the block of contiguous public ports is allocated in state 402. Instead of storing the public IP address, the private IP address, the public IP address port, and the private IP address port for the data connection associated with the next data packet from the first user device 108A to the NAT table, the NAT module 230 can simply note that the IP address of the next data packet from the first user device 108A and the IP address of the previously received data packet from the first user device 108A are offset by one private port and one pubic port. In some embodiments, the offset information can be stored by a counter and/or an index value: each time the NAT module 230 is configured to assign a new public port in the state 406, the counter and the index value will be incremented by 1. The computerized process 400 then moves to state 404.

In state 408, the NAT module 230 can be configured to determine whether or not the block size has been reduced to one, where the block size is the size of a block of contiguous public ports allocated for a next non-sequential private port of the first user device 108A. If the block size has been reduced to one, then the computerized process 400 moves to state 416; otherwise the computerized process 400 moves to state 410.

In state 410, because the WAG 102 receives a data packet from a non-sequential private port from the first user device 108A in previous state 404, the NAT module 230 is configured to allocate another block of contiguous public ports for the non-sequential private port from the first user device 108 and, if any, subsequent sequential private ports. In some embodiments, the size of the block of contiguous public ports allocated for the first user device 108A will be reduced every time a non-sequential private port is opened for data packet from the first user device 108A. In some embodiments, the block size can be reduced by dividing the previous block size by 2 (and rounding up or down if necessary). In some embodiments, the block size can be reduced by subtracting a fixed number or variable number from the existing block size. In some embodiments, the block size can be reduced by any suitable methods.

Still in state 410, the NAT module 230 is configured to assign the first public IP address with a new starting public port to the last non-sequential private port from which a data packet is received in previous state 404. The NAT module 230 stores the public IP address, the private IP address, the starting public IP address port, and the starting private IP address port for the data connection associated with the data packet from the last non-sequential private port. The computerized process 400 then moves to state 412.

In state 412, the WAG 102 receives a next data packet destined for the public network from the first user device 108A that has the first private IP address with a next private port. The NAT module 230 can be configured to check whether or not the next private port of the first private IP address is contiguous to a previously received private port of the first private IP address. In other words, the NAT module 230 can be configured to check whether or not the previously received private port and the next private port are sequential. If the next private port and the previously received private port are sequential, the computerized process 400 moves to state 414. If the next private port and the previously received private port are not sequential, the computerized process 400 moves to state 408.

In state 414, the NAT module 230 is configured to assign a next public port from the block of contiguous public ports to the next private port, where the block of contiguous public ports is allocated in previous state 410. Instead of storing the public IP address, the private IP address, the public IP address port, and the private IP address port for the data connection associated with the next data packet from the first user device 108A to the NAT table, the NAT module 230 can simply note that the IP address of the next data packet from the first user device 108A and the IP address of the previously received data packet from the first user device 108A are offset by one private port and one pubic port. In some embodiments, the offset information can be stored by a counter and/or an index value: each time the NAT module 230 is configured to assign a new public port in the state 406, the counter and or the index value will be incremented by 1. The computerized process 400 then moves to state 412.

In state 416, the NAT module 230 is configured to assign the first public IP address with a new public port to the non-sequential private port from which a data packet is received in previous state 404. The NAT module 230 stores the public IP address, the private IP address, the public IP address port, and the private IP address port for the data connection associated with the data packet from the last non-sequential private port. The computerized process 400 stays in state 416 for any new data packet received from the first user device 108A.

Figure 5C:
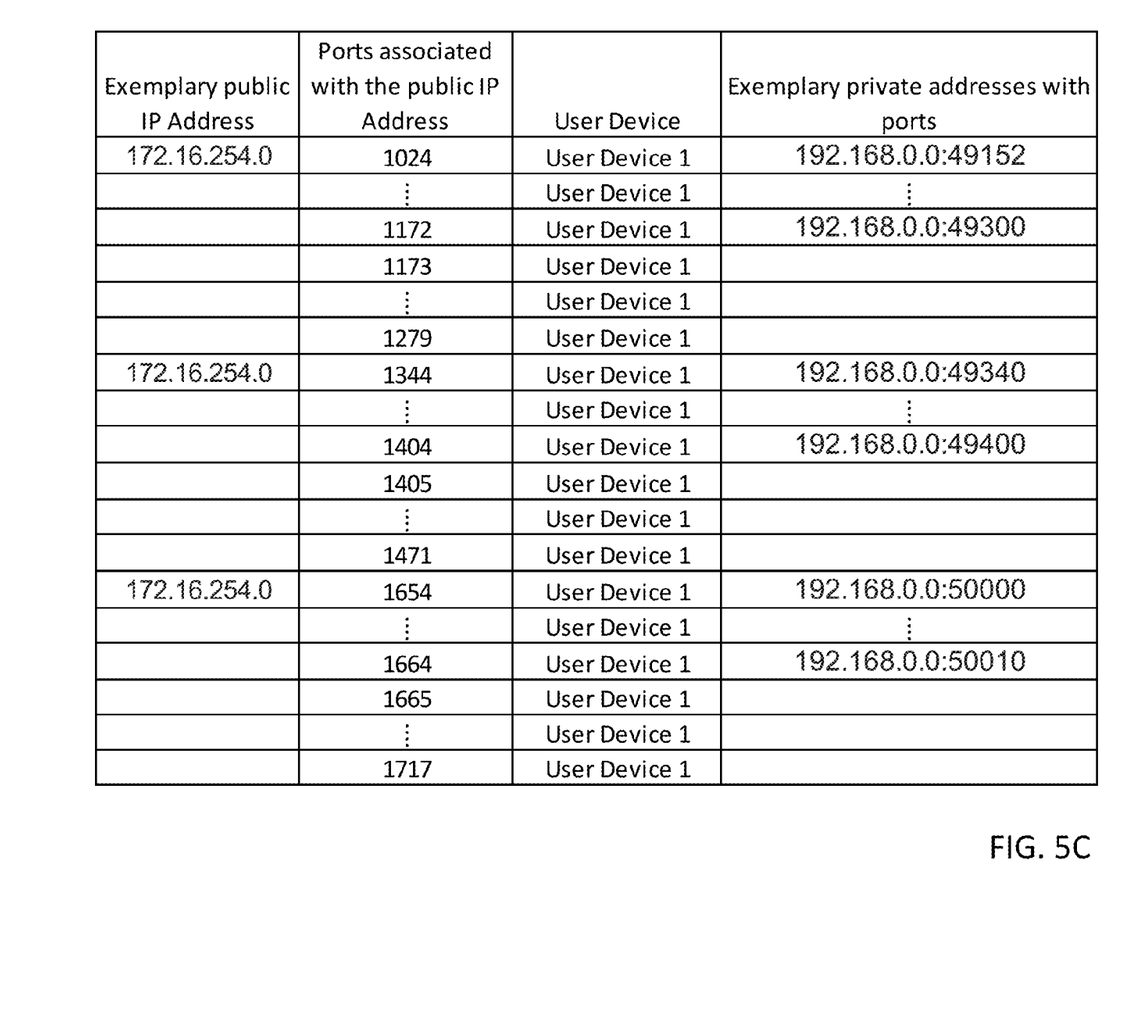
FIG. 5C illustrates another example of a network address translation table under network port address translation, according to some embodiments of the disclosed subject matter.

FIG. 5C illustrates an example of a NAT table under the computerize process 400. Specifically, FIG. 5C illustrates the effect of dynamically changing the block size of contiguous public ports assigned to a user device, the user device 1. As a non-limiting example, assuming private ports opened for the user device 1 are not sequential and are from port 49152 to port 49300, from port 49340 to port 49400, and from port 50000 to port 50010. FIG. 5C further assumes that a default block size is 256, and the block size will be reduced by 50% each time a non-sequential private port of the user device 1 is opened for data packet. When the WAG 102 receives the first data packet from the user device 1 with private IP port 192.168.0.0:49152, the NAT module 230 is configured to allocate 256 contiguous public ports for user device 1. Because the data packets from the user device are initially associated with sequential private ports 49152 to 49300, FIG. 5C shows that private IP port 192.168.0.0: 49152 is mapped to public IP port 172.16.254.0:1024, and private port 192.168.0.0:49300 is mapped to public port 172.16.254.0:1172, where the starting public port 1024 is chosen arbitrarily. Note that public ports 172.16.254.0:1173 to 172.16.254.0:1279 are also reserved for the user device 1 because the block size is set to be 256.

Next, when the WAG 102 receives another data packet from the user device 1 with private IP port 192.168.0.0: 49340, because this private IP port is not sequential with the previous private IP port 192.168.0.0:49300, the NAT module 230 is configured to allocate another 128 contiguous public ports for user device 1 (e.g., starting with the next available public port number, as other devices may have been mapped with public port blocks by the NAT in the meantime), where 128 is 50% of the previous block size 256. Because the second range of data packets from the user device 1 is associated with sequential private ports 49340 to 49400, FIG. 5C shows that private port 192.168.0.0:49340 is mapped to public port 172.16.254.0:1344, and private port 192.168.0.0:49400 is mapped to public port 172.16.254.0: 1404, where the new starting public port 1404 is chosen arbitrarily. Note that public ports 172.16.254.0:1405 to 172.16.254.0:1471 are also reserved for the user device 1 because the new block size is set to be 128.

Next, when the WAG 102 receives another data packet from the user device 1 with private IP port 192.168.0.0: 50000, because this private IP port is not sequential with the previous private IP port 192.168.0.0:49400, the NAT module 230 is configured to allocate another 64 contiguous public ports for user device 1 (e.g., starting with the next available public port number, as other devices may have been mapped with public port blocks by the NAT in the meantime), where 64 is 50% of the previous block size 128. Because the third range of data packets from the user device 1 is associated with sequential private ports 50000 to 50010, FIG. 5C shows that private port 192.168.0.0:50000 is mapped to public port 172.16.254.0:1654, and private port 192.168.0.0:50010 is mapped to public port 172.16.254.0: 1664, where the new starting public port 1654 is chosen arbitrarily. Note that public ports 172.16.254.0:1665 to 172.16.254.0:1717 are also reserved for the user device 1 because the new block size is set to be 64.

In some embodiments, the block size of each user device is separately maintained. Therefore, an occurrence of a non-sequential private port from the user device 1 will only change the block size of the user device 1 but not the block size of other user devices. In some embodiments, the block size of each user device is shared, and, as a non-limiting example. an occurrence of a non-sequential private port from the user device 1 will change the block size of all user devices.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

A "server," "module," and "interface" is not software per se and includes at least some tangible, non-transitory hardware that is configured to execute computer readable instructions. In addition, the phrase "based on" does not imply exclusiveness—for example, if X is based on A, X can also be based on B, C, and/or D.

What is claimed is:

1. A computerized method for mapping one public internet protocol (IP) address to multiple private IP addresses by associating one or more sets of port numbers from a total set of available port numbers for the public IP address with each private IP address, the method comprising:
   receiving, by a computing device, a first data packet from a first user device destined for a public network, wherein the first user device has a first private IP address;
   associating, by the computing device, with the first private IP address of the first user device (a) the public IP address and (b) a first set of port numbers from the total set of available port numbers for the public IP address, and for each new connection from the first private IP address with incremental port numbers storing, by the computing device, an offset for each connection from a first port number from the first set of port numbers;
   receiving, by the computing device, a second data packet from a second user device destined for the public network, wherein the second user device has a second private IP address;
   associating, by the computing device, with the second private IP address of the second user device (a) the public IP address and (b) a second set of port numbers from the total set of available port numbers for the public IP address, and for each new connection from the second private IP address with incremental port numbers storing, by the computing device, an offset for each new connection from a first port number from the second set of port numbers,
   whereby the first private IP address and the second private IP address are mapped to the same public IP address, and using, by IP connections from the first user device, the first set of port numbers from the public IP address and an offset for each new connection associated with the first private IP address, and using, by IP connections from the second user device, the second set of port numbers from the public IP address and an offset for each new connection associated with the second private IP address;
   storing a mapping between the first private IP address and the public IP address, comprising:
   the first private IP address;
   a pointer to a first private port number associated with an IP connection for the first data packet;
   the public IP address; and
   a pointer to a first public port number from the first set of port numbers;
   associating a first index value of zero for the IP connection for the first data packet, and determining, by the computing device, that the first private port number maps to the first public port number for the IP connection;
   receiving a new IP packet associated with a second IP connection for the first user device; and
   associating a second index value of one for the second IP connection, and determining, by the computing device, that a second private port number, equal to the first private port number plus the second index value of one maps to a second public port number, equal to the first public port number plus the second index value of one, for the second IP connection.

2. The method of claim 1, wherein the first set of port numbers and the second set of port numbers are each contiguous sets of port numbers.

3. The method of claim 2, wherein the first set of port numbers and the second set of port numbers are different sets, and there are not any overlapping port numbers between the first set of port numbers and the second set of port numbers.

4. The method of claim 1, further comprising:
   associating the first private port number with the first public port number from the first set of port numbers;
   receiving a third data packet from the first user device destined for the public network, wherein the third data packet is for a different IP connection than the first data packet;
   determining the first private port number associated with the first data packet is sequential with the second private port number associated with the third data packet; and
   associating the second private port number with a next public port number from the first set of port numbers after the first public port number.

5. The method of claim 1, further comprising:
   associating the first private port number with the first public port number from the first set of port numbers;
   receiving a third data packet from the first user device destined for the public network, wherein the third data packet is for a different IP connection than the first data packet;

determining the first private port number associated with the first data packet is not sequential with the second private port number associated with the third data packet, and there are port numbers between the first private port number and the second private port number that are not associated with IP connections;

associating with the first private IP address of the first user device a third set of port numbers from the total set of available port numbers for the public IP address to use for a third data packet IP connection; and associating the second private port number with a first public port number from the second set of port numbers.

6. A computing system configured to map one public internet protocol (IP) address to multiple private IP addresses by associating one or more sets of port numbers from a total set of available port numbers for the public IP address with each private IP address, comprising a processor configured to run a module stored in memory that is configured to cause the processor to:

receive a first data packet from a first user device destined for a public network, wherein the first user device has a first private IP address;

associate with the first private IP address of the First user device (a) the public IP address and (b) a first set of port numbers from the total set of available port numbers for the public IP address, and for each new connection from the first private IP address with incremental port numbers store, by a computing device, an offset for each connection from a first port number from the first set of port numbers;

receive a second data packet from a second user device destined for the public network, wherein the second user device has a second private IP address;

associate with the second private IP address of the second user device (a) the public IP address and (b) a second set of port numbers from the total set of available port numbers for the public IP address, and for each new connection from the second private IP address with incremental port numbers store, by the computing device, an offset for each new connection from a first port number from the second set of port numbers, whereby the first private IP address and the second private IP address are mapped to the same public IP address, and use, by IP connections from the first user device, the first set of port numbers from the public IP address and an offset for each new connection associated with the first private IP address, and use, by IP connections from the second user device, the second set of port numbers from the public IP address and an offset for each new connection associated with the second private IP address;

store a mapping between the first private IP address and the public IP address, comprising;
the first private IP address;
a pointer to a first private port number associated with an IP connection for the first data packet;
the public IP address; and
a pointer to a first public port number from the first set of port numbers;

associate a first index value of zero for the IP connection for the first data packet, and determine, by the computing device, that the first private port number maps to the first public port number for the IP connection;

receive a new IP packet associated with a second IP connection for the first user device; and associate a second index value of one for the second IP connection, and determine, by the computing device, that a second private port number, equal to the first private port number plus the second index value of one maps to a second public port number, equal to the first public port number plus the second index value of one, for the second IP connection.

7. The computing system of claim 6, wherein the first set of port numbers and the second set of port numbers are each contiguous sets of port numbers.

8. The computing system of claim 7, wherein the first set of port numbers and the second set of port numbers are different sets, and there are not any overlapping port numbers between the first set of port numbers and the second set of port numbers.

9. The computing system of claim 6, wherein the module is further configured to cause the processor to:
associate the first private port number with the first public port number from the first set of port numbers;
receive a third data packet from the first user device destined for the public network, wherein the third data packet is for a different IP connection than the first data packet;
determine the first private port number associated with the first data packet is sequential with the second private port number associated with the third data packet; and
associate the second private port number with a next public port number from the first set of port numbers after the first public port number.

10. The computing system of claim 6, wherein the module is further configured to cause the processor to:
associate the first private port number with the first public port number from the first set of port numbers;
receive a third data packet from the first user device destined for the public network, wherein the third data packet is for a different IP connection than the first data packet;
determine the first private port number associated with the first data packet is not sequential with the second private port number associated with the third data packet, and there are port numbers between the first private port number and the second private port number that are not associated with IP connections;
associate with the first private IP address of the first user device a third set of port numbers from the total set of available port numbers for the public IP address to use for a third data packet IP connection; and
associate the second private port number with a first public port number from the second set of port numbers.

11. A non-transitory computer readable medium comprising executable instructions operable to cause an apparatus to:
receive a first data packet from a first user device destined for a public network, wherein the first user device has a first private IP address;
associate with the first private IP address of the first user device (a) a public IP address and (b) a first set of port numbers from a total set of available port numbers for the public IP address, and for each new connection from the first private IP address with incremental port numbers store, by a computing device, an offset for each connection from a first port number from the first set of port numbers;
receive a second data packet from a second user device destined for the public network, wherein the second user device has a second private IP address;

associate with the second private IP address of the second user device (a) the public IP address and (b) a second set or port numbers from the total set of available port numbers for the public IP address, and for each new connection from the second private IP address with incremental port numbers store, by the computing device, an offset for each new connection from a first port number from the second set of port numbers, whereby the first private IP address and the second private IP address are mapped to the same public IP address, and use, by IP connections from the first user device, the first set of port numbers from the public IP address and an offset for each new connection associated with the first private IP address, and use, by IP connections from the second user device, the second set of port numbers from the public IP address and an offset for each new connection associated with the second private IP address;

store a mapping between the first private IP address and the public IP address, comprising:
   the first private IP address;
   a pointer to a first private port number associated with an IP connection for the first date packet;
   the public IP address; and
   a pointer to a first public port number from the first set of port numbers;

associate a first index value of zero for the IP connection for the first data packet, and determine that the first private port number maps to the first public port number for the IP connection;

receive a new IP packet associated with a second IP connection for the first user device; and associate a second index value of one for the second IP connection, and determine, by the computing device, that a second private port number, equal to the first private port number plus the second index value of one maps to a second public port number, equal to the first public port number plus the second index value of one, for the second IP connection.

12. The non-transitory computer readable medium of claim 11, further comprising executable instructions operable to cause an apparatus to:
   associate the first private port number with the first public port number from the first set of port numbers;
   receive a third data packet from the first user device destined for the public network, wherein the third data packet is for a different IP connection than the first data packet;
   determine the first private port number associated with the first data packet is sequential with the second private port number associated with the third data packet; and
   associate the second private port number with a next public port number from the first set of port numbers after the first public port number.

13. The non-transitory computer readable medium of claim 11, further comprising executable instructions operable to cause an apparatus to:
   associate, the first private port number with the first public port number from the first set of port numbers;
   receive a third data packet from the first user device destined for the public network, wherein the third data packet is for a different IP connection than the first data packet;
   determine the first private port number associated with the first data packet is not sequential with the second private port number associated with the third data packet, and there are port numbers between the first private port number and the second private port number that are not associated with IP connections;
   associate with the first private IP address of the first user device a third set of port numbers from the total set of available. port numbers for the public IP address to use for a third data packet IP connection; and
   associate the second private port number with a first public port number from the second set of port numbers.

* * * * *